United States Patent [19]

Shiratori

[11] Patent Number: 5,678,031
[45] Date of Patent: Oct. 14, 1997

[54] METHOD OF TESTING INTERCONNECTIONS OF AN LSI ON A SIMULATOR THROUGH THE USE OF EFFECTIVE PULSE WIDTHS

[75] Inventor: Akihiro Shiratori, Kanagawa, Japan

[73] Assignee: NEC Corporation, Tokyo, Japan

[21] Appl. No.: 457,576

[22] Filed: Jun. 1, 1995

[30] Foreign Application Priority Data

Jun. 3, 1994 [JP] Japan .................................. 6-122574

[51] Int. Cl.$^6$ .................................................. G01R 13/30
[52] U.S. Cl. ........................... 395/500; 395/550; 364/490
[58] Field of Search ................................ 364/578, 587, 364/569, 488, 489, 490, 491; 395/500; 264/587, 569; 371/1, 61; 324/751

[56] References Cited

U.S. PATENT DOCUMENTS

| | | |
|---|---|---|
| 4,748,407 | 5/1988 | Brunner et al. .................... 324/751 |
| 5,122,978 | 6/1992 | Merrill ................................... 364/587 |
| 5,422,896 | 6/1995 | Shiratori et al. ........................ 371/61 |
| 5,436,853 | 7/1995 | Shimohara ............................ 364/569 |
| 5,436,908 | 7/1995 | Fluker et al. ............................. 371/1 |

Primary Examiner—Kevin J. Teska
Assistant Examiner—Dan Fiul
Attorney, Agent, or Firm—Whitham, Curtis, Whitham & McGinn

[57] ABSTRACT

An interconnection test for a design of an LSI including a functional circuit is executed on a simulator. The test method is applied to interconnections between the external pins of the LSI and inputs of a functional circuit or microcomputer. Input pulses each having a pulse width smaller than the minimum effective pulse width are sequentially input from the external pins while the inputs of the microcomputer are being monitored. The simulator generates an output signal when it detects a pulse having a pulse width smaller than the minimum effective pulse width, thereby indicating the correctness of the interconnections. The interconnection test is executed prior to a separate functional test for the microcomputer.

12 Claims, 7 Drawing Sheets

METHOD OF TESTING INTERCONNECTIONS OF AN LSI ON A SIMULATOR THROUGH THE USE OF EFFECTIVE PULSE WIDTHS

BACKGROUND OF THE INVENTION (a) Field of the Invention

The present invention relates to a method for testing on a simulator interconnections of an LSI having a functional circuit block and, more particularly, to a method for testing interconnections between external pins of an LSI and inputs of a functional circuit bloc such as a microcomputer included in the LSI.

(b) Description of Related Art

To design new equipment such as an air conditioner by an equipment maker, a CAD (Computer-Aided Design) is used by the equipment maker for designing an LSI for controlling the operation of the air conditioner. After the new LSI is designed by the equipment maker, the design for the LSI is tested or examined in its interconnections and operation by an LSI manufacturer, following which the LSI is actually manufactured in a mass production by the LSI manufacturer according to the design.

FIG. 1 exemplarily shows a structure of a functional block such as a microcomputer block, which is suggested by an LSI manufacturer to be employed in an LSI. The microcomputer block has a configuration such that a microcomputer in the block can be tested separately from other circuit portion in the LSI. The microcomputer block includes the microcomputer 95 and a selector 94 for selecting first N inputs 91 or second N inputs 92 for the inputs of the microcomputer 95 in accordance with a mode control signal supplied through a mode control input 93. In a normal operation mode for the microcomputer 95, the first N inputs 91 are selected by the selector 94 while, in a separate test operation mode, the second N inputs are selected by the selector 94. In FIG. 1, a signal pattern detecting section 97 for testing input signal timing is shown which is virtually disposed on a testing simulator in the LSI manufacturer for monitorring and analyzing the first N inputs of the microcomputer block during a normal operation mode of the microcomputer block.

The signal pattern detecting section 97 is formed in a testing simulator as a timing analyzer. The timing analyzer can verify the correctness of the logic circuit design and the correctness of the signal timing. To this end of verification, signal timing patterns of the inputs of the microcomputer 95 is described in a specification in accordance with a predetermined format. If there is inconsistency between an observed signal pattern and the description in the specification, an alarm signal together with signals representing the time instant of the inconsistency, the details of the inconsistency and the pin on which the inconsistency occurred is output from the signal pattern detecting section 97. The signal pattern detecting section 97 does not monitor and verify the second N inputs of the microcomputer block because a test pattern in a separate test mode for the microcomputer block has a different signal pattern generally inconsistent with the description in the specification and has been verified as a correct testing pattern prior to the test execution.

FIG. 2 shows an LSI designed by an equipment maker which includes a microcomputer block 110, such as shown in FIG. 1. The LSI further includes a first logic circuit 109 having N inputs connected to external input pins 107 and N outputs connected to first N inputs of the microcomputer block 110, a second logic circuit 112 having M inputs connected to the outputs of the microcomputer block 110 and L outputs connected to external output pins 113, and other circuit blocks not shown in the drawing. The microcomputer block 110 has second N inputs connected directly to the external input pins 107 for a separate test mode. The M outputs of the microcomputer block 110 are also connected directly to output pins 111 for outputting test result signals for the microcomputer block 110. In this configuration, the microcomputer block 110 can be tested separately from other circuit portions including the first and second logic circuits 109 and 112. The configuration of the LSI is loaded or simulated on a testing simulator to operate the LSI in virtual operation modes including a normal operation mode and a separate test operation mode of the LSI.

The potential of the mode control pin 108 is controlled such that N outputs of the first logic circuit 109 is selected as the inputs of the microcomputer through the first N inputs during a normal operation mode, and such that the external input pins 107 is selected as the inputs of the microcomputer through the second N inputs during a separate test mode for the microcomputer. The signal pattern detecting section 97 in FIG. 1 monitors the first N inputs of the microcomputer block 110 during a normal operation mode or a testing mode for the first logic circuit in the LSI and judges whether the signal patterns supplied from the first logic circuit 109 are consistent with the description in the specification for the logic operation of the LSI.

During a separate test operation mode for the microcomputer block 110, signals from the external pins 107 are directly supplied to the microcomputer so that the results of processing in the microcomputer are output through the test result output pins 111. In this manner, the separate test can be executed for the microcomputer block 110 without being affected by the uncertain operation of the first and second logic circuits 109 and 112, thereby facilitating the design test for the LSI.

For the reasons as described above, the LSI manufacturer requests the equipment maker to include in an LSI the circuit configuration for a separate test of a microcomputer block or other functional circuit block.

FIG. 3 shows a procedure of a separate test for a functional circuit block such as a microcomputer block to verify the design for the LSI.

First, timing patterns for the signals supplied through the first inputs (normal operation mode inputs) of the microcomputer are described in a specification in accordance with a format of the timing analyzer (step S121). Next, interconnection data is prepared for the LSI in the simulator (step S122). Then, testing for the logic design is executed in a normal operation mode to verify the logical configuration of the LSI, and subsequently, testing for the timing of the signal patterns is executed for verifying the operation of the LSI in a normal operation mode (step S123). Subsequently, a separate function test for the microcomputer is executed and it is judged in step S125 whether or not the test results are consistent with the expected results as specified by the specification for the output of the microcomputer. If the results are inconsistent with the expected results, then the process returns to step S122 for analyzing and rewriting the interconnection data for the LSI. On the other hand, if the results have no inconsistency with the expected results, the verification for the design of the LSI is finished in the simulator (step S126).

It has been a general practice, as described before, that the circuit design of an LSI including a functional circuit block and enabling a separate test for the functional circuit block is designed by an equipment maker. In general, the equipment maker cannot verify a circuit design for an LSI including a functional circuit block. In such a case, the correctness of the design of the LSI cannot be confirmed until a separate test of the functional circuit block is performed by an LSI manufacturer after receiving the circuit design of the LSI in a CAD data.

The defects of the circuit design often include incorrect order of the interconnections between the functional circuit block and other circuit portions and incorrect numberring of the lines, all of which result from human errors and consume a large amount of time for correction.

SUMMARY OF THE INVENTION

In view of the foregoing, it is an object of the present invention to provide a method for testing interconnections between a circuit block and other portions of an LSI, which can reduce the amount of time necessary for testing a design of an LSI having a functional circuit to be tested by a separate test therefor.

In accordance with the present invention, there is provided a method for testing interconnections between external pins of an electric circuit and first inputs of a circuit block disposed therein. The method includes the steps of applying a first pulse to one of the external pins, the first pulse having a first pulse width smaller than a minimum effective pulse width for the electric circuit, electrically monitorring the first inputs during the applying of the first pulse, and generating an output signal when a pulse having a pulse width substantially equal to the first pulse width is detected on one of the first inputs corresponding to the one of the external pins.

BRIEF DESCRIPTION OF THE DRAWINGS

The above and other objects, features and advantages of the present invention will be more apparent from the following description, referring to accompanying drawings in which.

DESCRIPTION OF THE PREFERRED EMBODIMENTS

Figure 4:
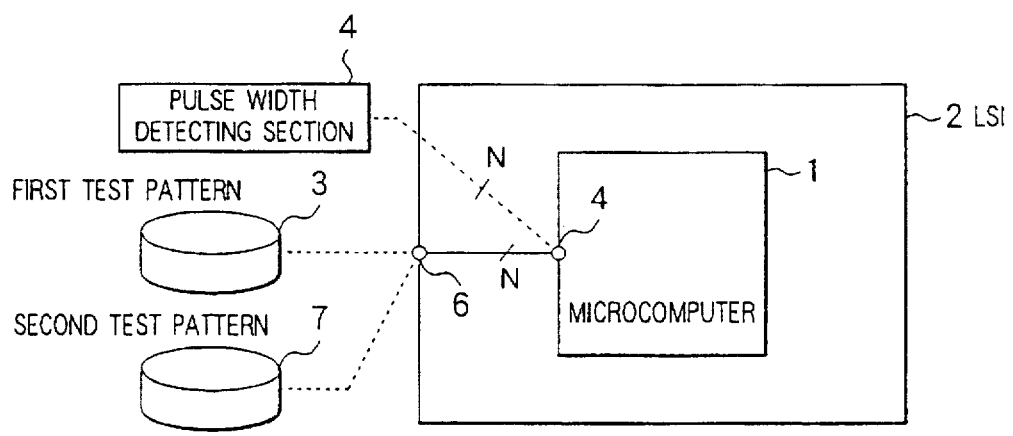
FIG. 4 is a block diagram illustrating a microcomputer block on a simulator during an interconnection test according to a first embodiment of the present invention.
Figure 5:
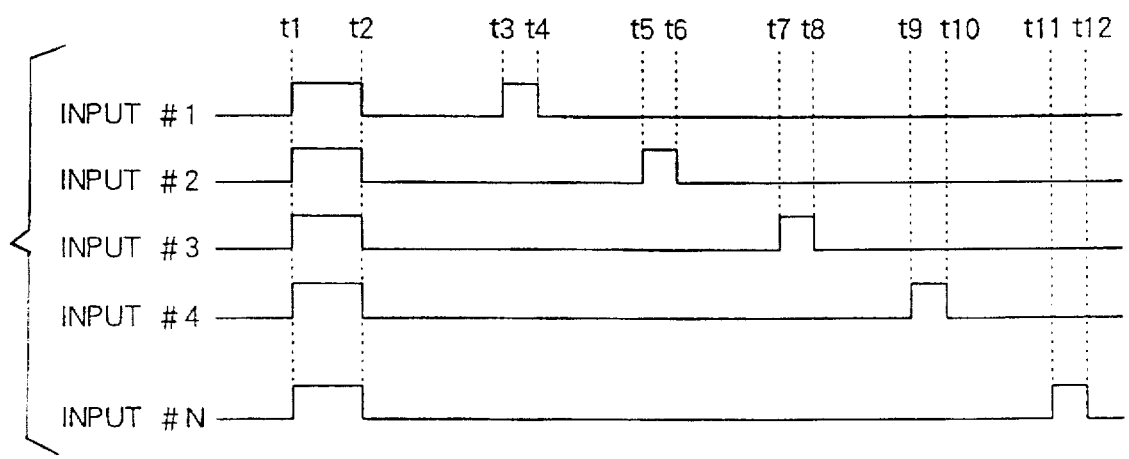
FIG. 5 is a timing chart showing a test signal pattern used in the test method according to the first embodiment.

FIG. 4 shows an LSI virtually implemented on a simulator for testing or verifying the design for the LSI, to which a method according to a first embodiment of the present invention can be applied. FIG. 5 is a timing chart of a signal pattern in the method according to the first embodiment.

In FIG. 4, the LSI 2 on the simulator includes a microcomputer 1 to which a separate test can be executed independently of other circuit portion of the LSI 2. Each of the inputs of the microcomputer 1 is connected to a corresponding one of external pins 6 via interconnections in the LSI 2. The simulator also includes a first test pattern generating section 3 and a second test pattern generating section 7 each separately supplying a test pattern through the external pins 6 and interconnections to the microcomputer 1 during an interconnection test procedure.

The first test pattern generating section 3 generates a first test pattern including a low level pulse which has a first pulse width smaller than the minimum effective pulse width, by which a pulse effectively drives the microcomputer 1 or other circuit portion of the LSI 2. The second test pattern generating section 7 generates a second test pattern including a high level pulse which has a second pulse width larger than the minimum effective pulse width as mentioned above.

The simulator has a pulse width detecting section 5 which monitors the inputs 4 of the microcomputer 1 during the interconnection test procedure, detects signals appearing on the inputs 4 of the microcomputer 1, and judges whether or not the pulse width of each of the signals appearing on the inputs 4 is smaller than the minimum effective pulse width. The pulse width detecting section generates an output signal at each time when the pulse width of one the input signals is smaller than the minimum effective pulse width. In this example, the minimum effective pulse width for LSI is set at 10 nanoseconds (ns). The first test pattern generating section 3 generates a signal pattern including an individual pulse having a pulse width of, for example, 5 ns while the second test pattern generating section 7 generates a signal pattern including an individual pulse having a pulse width of, for example, 15 ns.

Figure 1:
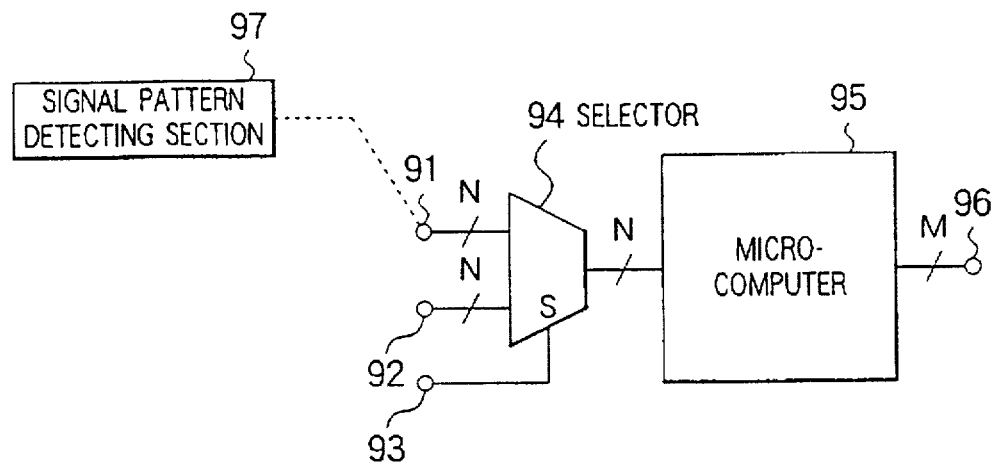
FIG. 1 is a block diagram illustrating a microcomputer block in an LSI, for showing a conventional test method for an LSI design.
Figure 2:
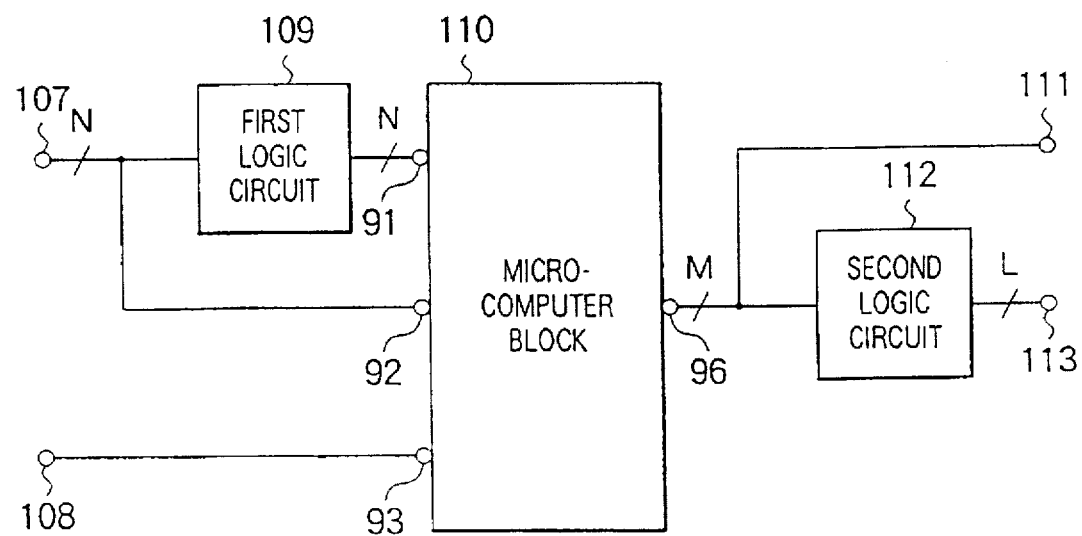
FIG. 2 is a block diagram illustrating an LSI including a microcomputer block such as shown in FIG. 1, for showing the conventional test method.
Figure 3:
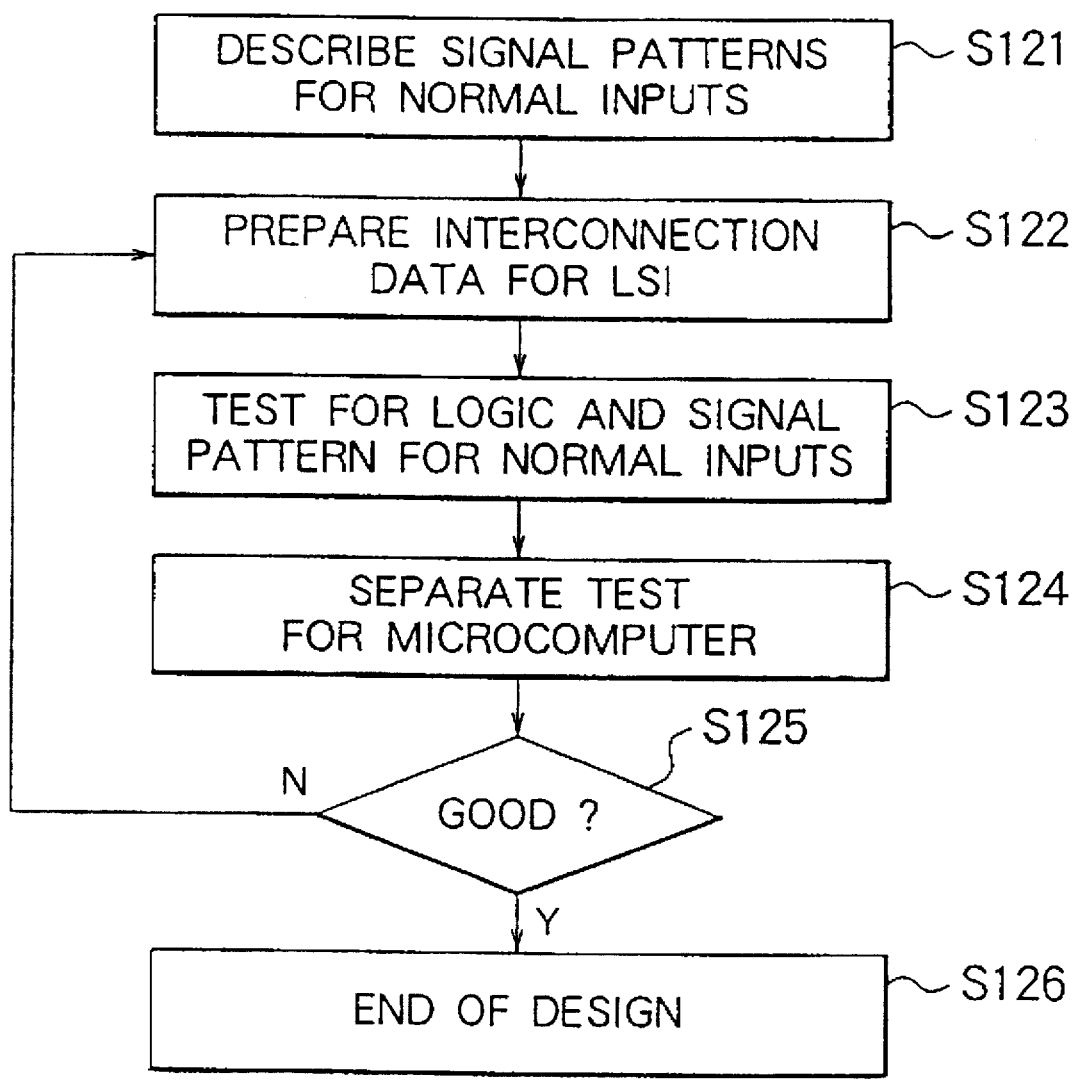
FIG. 3 is a flow-chart showing the procedure of the conventional test method.

FIG. 5 is a timing chart showing test signal patterns generated by the first and second test pattern generating sections 3 and 7 for testing interconnections between the external pins 6 and the inputs 4 of the microcomputer 1 in the LSI 2 shown in FIG. 2.

During a time interval between t1 and t2, a large width pulse (second pulse) having a pulse width of 15 ns at a high level is supplied from the second pattern generating section 7 to each of the external pins 6 including first pin #1 to Nth pin #N. If a differential circuit exists along one of the interconnections between the external pins 6 and the inputs of the microcomputer 1 by an error, an output alarm signal will be generated by the pulse width detecting section 5 detecting the differential of the rising edge or falling edge of the second pulse. Otherwise, i.e., if the differential circuit does not exist, the alarm will not be generated to allow the subsequent test signal pattern to be effective.

Subsequently, small width pulses (first pulses) having high levels during the time intervals t3 and t4, t5 and t6, . . . ., and t11 and t12 are sequentially supplied from the first test pattern generating section 3 to the external input pins 6. If the interconnection between the first pin of the external pins 6 and a corresponding one of the first inputs 4 of the microcomputer 1 is connected without fault, the pulse width detecting section detects the small width pulse to generate an output signal at the time instant t4. The output signal from the pulse width detecting section 5 includes the numberring of the pins receiving the small width pulse as well as the fact of receiving the small width pulse and the time instant of the detection, which may be displayed in a table format.

Similarly, at each of the time instants, t6, t8, . . . and t12, the pulse width detecting section S detects the small pulse width to generate an output signal at each of the time instants provided that each of the interconnections is correctly connected between each of the external pins 6 and corresponding one of the inputs 4 of the microcomputer 1. If an output signal is not generated by the pulse width detecting section 5 at one or more of the time instants t4, t6, t8, . . . , and t12, it is attributed to a fault in one or more of the interconnections between the external pins 6 and respective inputs of the microcomputer, as detailed below.

The small width pulse is sequentially input to the external pins 6 in the order of the numbering of the pins. Thus, a variety of faults can be detected in which two external pins are connected to one of the inputs of the microcomputer, in which one of the external pins is connected to two of the inputs of the microcomputer, or in which a wrong line is connected between one of the pins and one of the inputs of the microcomputer which does not correspond to the one of the pins.

On the other hand, if the interconnections are connected in good order between the external pins 6 and the inputs 4 of the microcomputer 1, output signals are successively generated from the pulse width detecting section 5 responsive to the small width pulses at the time instants t4, t6, t8, . . . , and t12.

Figure 6:
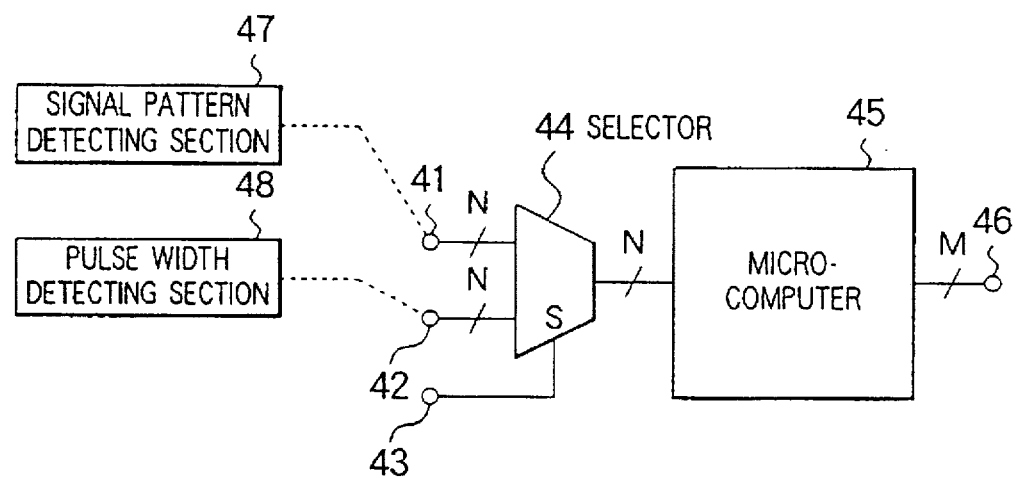
FIG. 6 is a block diagram illustrating a microcomputer block in a separate test including an interconnection test according to a second embodiment of the present invention.
Figure 7:
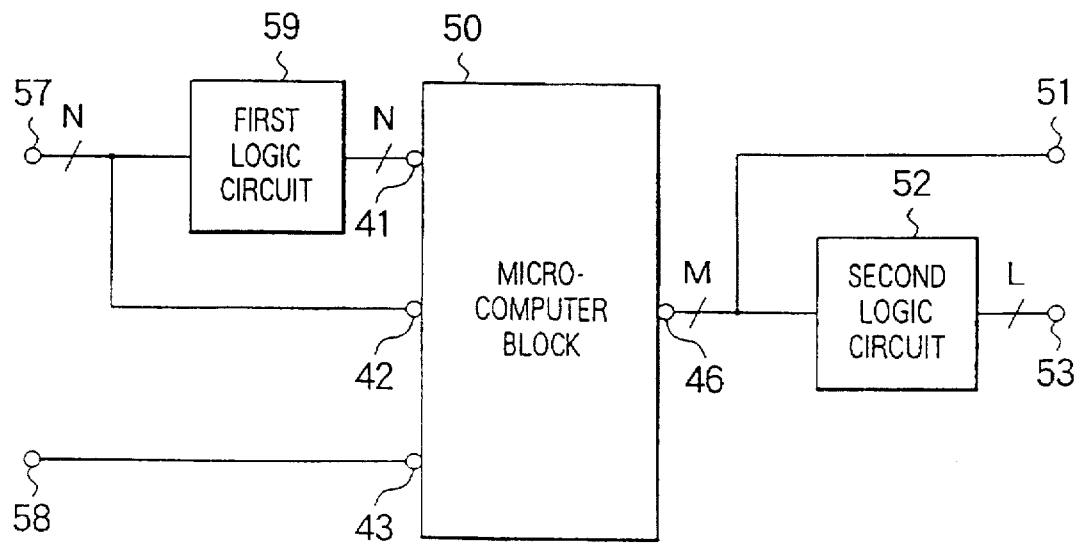
FIG. 7 is a block diagram illustrating an LSI including a microcomputer block such as shown in FIG. 7.

FIG. 6 shows a microcomputer block as a functional circuit block virtually implemented on a simulator for testing interconnections for the microcomputer by a method according to a second embodiment of the present invention, while FIG. 7 shows an LSI including a microcomputer block such as shown in FIG. 6.

The microcomputer block in FIG. 6 has a microcomputer 45 and a selector 44 for selecting first N inputs 41 or second N inputs 42 for the inputs of the microcomputer 45 in accordance with a mode control signal supplied through mode control input 43 of the block. The selector 44 selects the first N inputs 41 when the mode control signal designates a normal operation mode and selects the second N inputs 42 when the mode control signal designates a separate test operation mode. A signal pattern detecting section 47 is virtually disposed on the simulator to monitor the first N inputs 41 of the selector 44 during the normal operation mode, while a pulse width detecting section 48 is virtually disposed on the simulator to monitor the second N inputs of the selector 44 during the separate test mode for the microcomputer 45.

In FIG. 7, the LSI includes a first logic circuit 59, a second logic circuit 52 and other circuit blocks not shown in the drawing in addition to the microcomputer block 50 such as shown in FIG. 7. The first logic circuit 59 has N inputs connected to external pins 57 and N outputs connected to the first N inputs 41 of the microcomputer block 50. The second logic circuit 52 has M inputs connected to the outputs 46 of the microcomputer block 50 and L outputs connected to external output pins 53. The M outputs 46 of the microcomputer block 50 are also connected to test result output pins 51. The mode control input 43 of the microcomputer block 50 is connected to external control pin 58 for changeover of the operation modes of the LSI.

The signal pattern detecting section 47 monitors signals supplied through the first N inputs 41 of the microcomputer block 50 and compares the received signal pattern with a specification describing a correct or expected signal pattern for the first N inputs during a normal operation mode of the LSI. The pulse width detecting section 48 monitors the signals supplied through the second N inputs 42 of the microcomputer block and compares the pulse width of each of the received signals with the minimum effective pulse width of the LSI.

For example, each of the signal pattern detecting section 47 and the pulse width detecting section 48 is implemented by an analyzing function of a logic simulator for testing the LSI design. Prior to analyzing the input pattern, correct signal patterns for the first N inputs of the microcomputer are described in a predetermined format for a normal operation mode. The signal pattern detecting section 47 compares the received signal pattern with the correct timing pattern, then outputs a fault signal if the signal pattern appearing on the first N inputs of the microcomputer block is not consistent with the correct pattern. The fault signal represents the content of the fault, time instant of the fault and numberring of the input receiving the fault signal.

The second N inputs are not monitorred by signal pattern detecting section 47 because the test signal pattern does not generally meet the specification. The test signal pattern generally has a high frequency so as to provide a quick testing, and the correctness of the test pattern is verified prior to the test.

In a separate test mode for the microcomputer block 50, a test signal pattern for operation is directly supplied to the microcomputer block 50 from the external input pins 57 so that the results of processing by the microcomputer block 50 are output through the test result output pins 51. If it is assumed that the pulse width of the clock pulses for operating the microcomputer block 50 at the maximum operation frequency is 10 ns, i.e., if the minimum effective pulse width is 10 ns, the separate test is executed by a test signal pattern having a pulse width well greater than 10 ns, e.g. 15 ns. Accordingly, the test pattern supplied through the second N inputs 42 of the microcomputer block 50 are not detected by the pulse width detecting section 48, which detects a pulse having a pulse width less than the minimum effective pulse width 10 ns.

In the manner described above, the microcomputer block 50 is separately tested in its operation without being affected by the operation of the first and second logic circuits 59 and 52. When a microcomputer block is designed in an LSI by an equipment maker so as to be tested in a separate test mode, the semiconductor manufacturer requests the equipment maker to employ the circuit configuration as shown in FIG. 8 to facilitate the separate test for the microcomputer.

Figure 8:
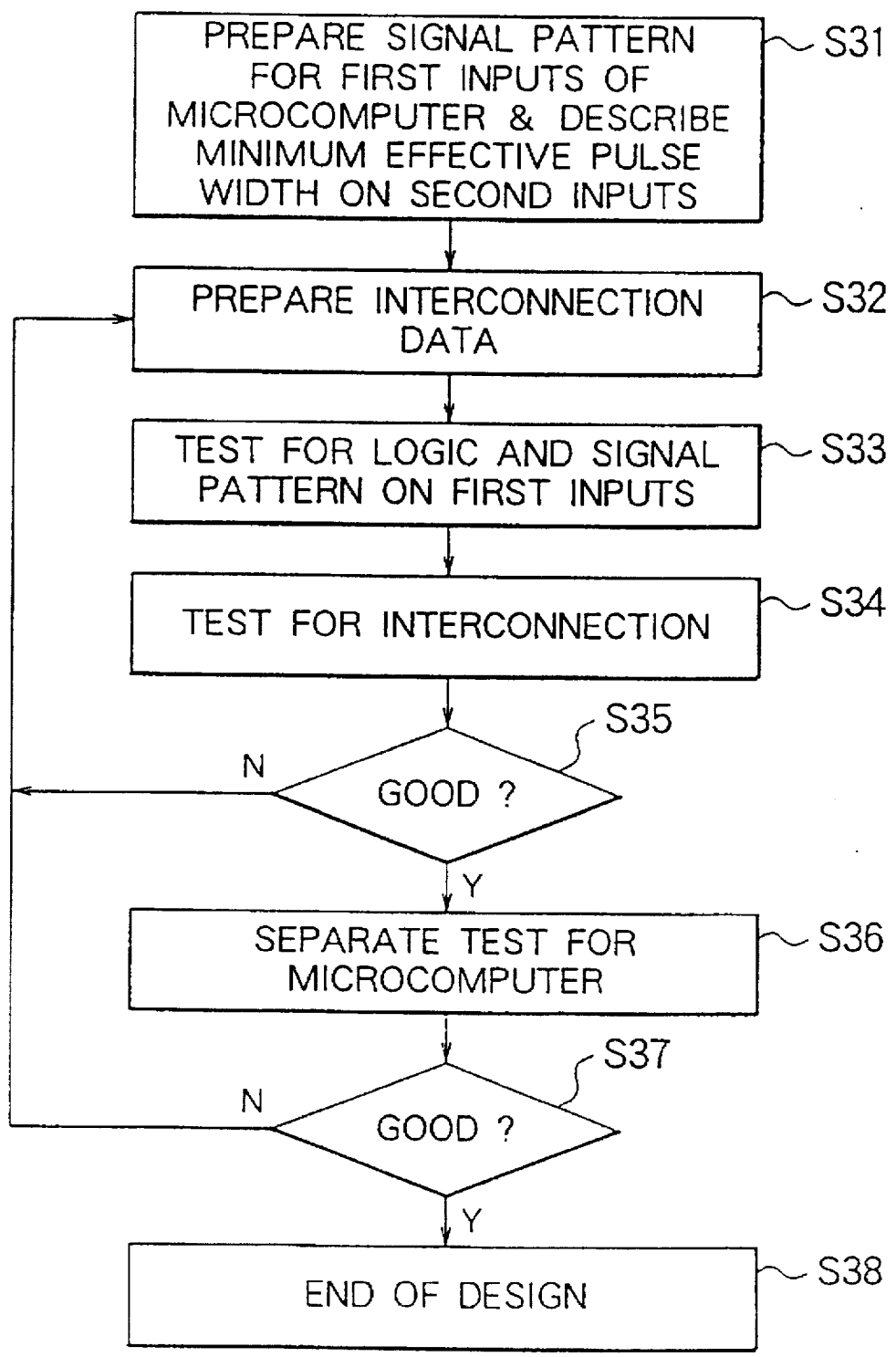
FIG. 8 is a flow-chart showing a simplified procedure of the separate test according to the second embodiment.

FIG. 8 shows a procedure of a separate test for the microcomputer block including the interconnection test according to the first embodiment.

In this example, a timing analyzing function of the testing simulator is used as the pulse width detecting section. Before the testing, signal patterns for the first N inputs of the microcomputer block and the minimum effective pulse width of the microcomputer is described in the specification of the simulator in accordance with the format of the timing analyzer (step S31). Next, interconnection data are described for the microcomputer block of the LSI (step S32) in the simulator.

In a separate test mode of the LSI, test patterns for testing logical configuration of the LSI are supplied through the external input pins to the first logic circuit (step S33). The output signal patterns appearing on the first N inputs are examined by the signal pattern detecting section 47 monitorring the first N inputs of the microcomputer block 50. Next, an interconnection test for the interconnections between the external pins and the second N inputs of the microcomputer block inputs are executed by using a signal pattern having a period lower than the minimum effective pulse width (step S34). If output signals are successively generated from the pulse width detecting section to show the correct interconnections, the step advances to a subsequent step S36 for a separate operation test for the function of the microcomputer block 50.

If the the output responsive to one or more of the small width puse is not obtained from the pulse width detecting section 48, the step returns to the step S32, wherein interconnections between the external pins and the inputs of the microcomputer block are analysed and corrected in accordance with the test results. If the test results obtained by the separate function test in step S36 are consistent with the expected results (step S37), the design for the LSI is verified in its correctness for the connection and the function thereof.

When an inconsistency between the expected results and the obtained results is generated during the separate function test in step S36, it is attributed to the incorrect interconnections between the outputs of the microcomputer block and the test result output pins of the LSI. In this case, the cause of the inconsistency can be found by simply tracing the signals from the outputs of the microcomputer block to the test result output pins.

Figure 9:
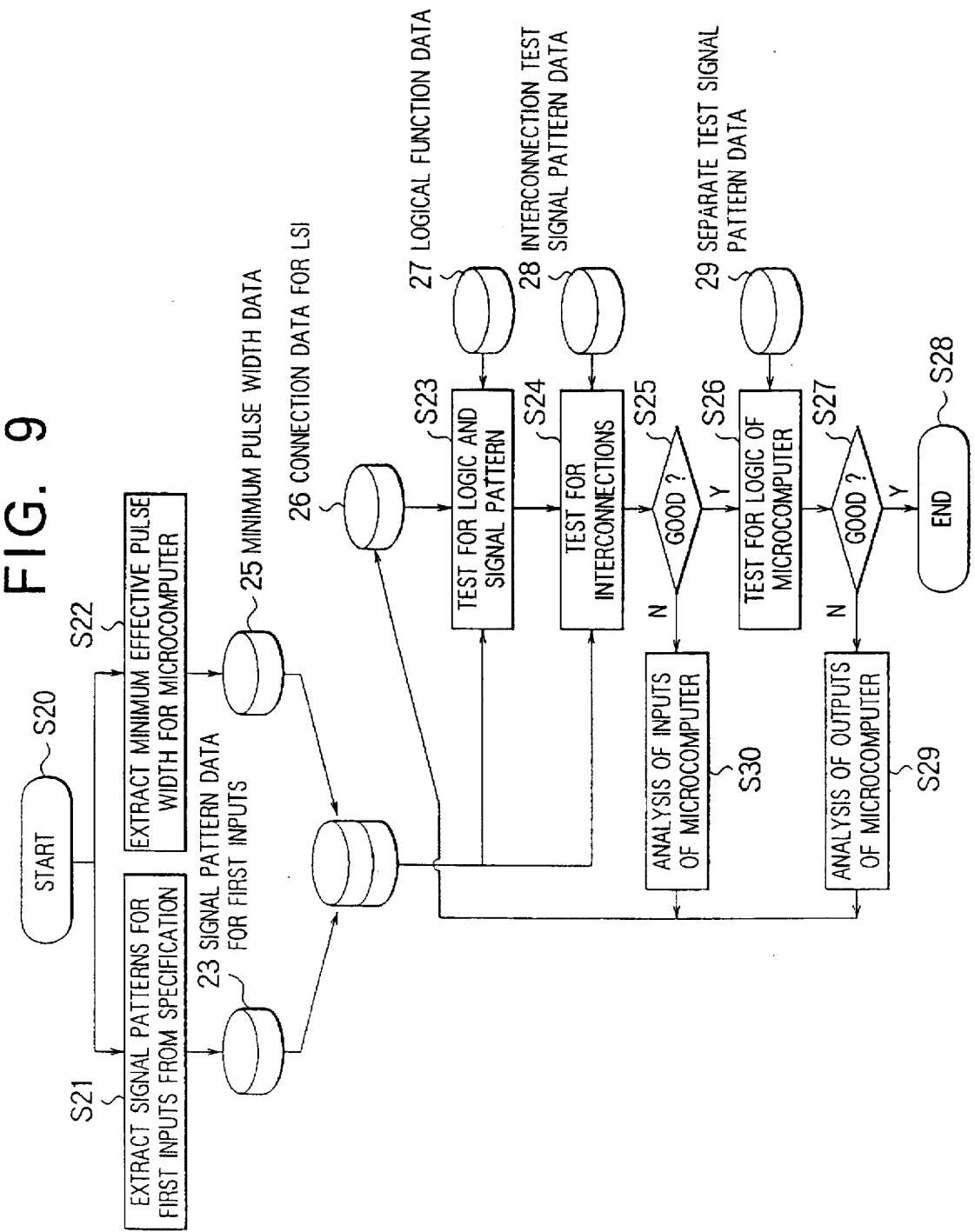
FIG. 9 is a flow-chart illustrating a detailed procedure of the second embodiment of the present invention.

FIG. 9 shows another procedure of the separate test for the microcomputer block shown in FIGS. 6 and 7, for showing the method according to the first embodiment in more detail.

Before the actual test procedure, signal patterns of the first N inputs of the microcomputer block are extracted from a timing specification (step S21) and described in a first specification 23. Further, data for the minimum effective pulse width is extracted (step S22) from the data for the microcomputer block and described in a second specification 25. The test procedure starts at the step S23 wherein testing for the logic circuit and the signal patterns is executed by using interconnection data 26 for the LSI, signal pattern data 27 representing the function of the microcomputer block, and the first and the second specifications 23 and 25.

In step S23, the function of the microcomputer is tested and signal timing supplied to the first N inputs of the microcomputer block is also tested. Subsequently, interconnections between the external input pins and the second N inputs of the microcomputer block are tested based on the interconnection test signal pattern data 28 in step S24. The interconnection test signal pattern data 28 includes a signal pattern such as shown in FIG. 5. In this step, if correctness of the interconnections between the external pins and the second N inputs of the microcomputer block is verified (step S25), the procedure advances to a step S26 wherein the logic function for the microcomputer block 50 is analysed. If an error is found during the interconnection test, the error is analysed in step S30. The results of the analysis are fed back to the interconnection data 28 to rewrite the same.

In the step S26 of analysis of the logic circuit, separate test signal pattern data 29 for the separate function test for the microcomputer is used. If the results of the logical function of the microccomputer obtained in the step S26 are verified to be correct (step S27), the test procedure is finished, and if not, the procedure advances to a step S29 wherein the outputs of the microcomputer are analysed. The results of the analysis are fed back to the interconnection data 28 to rewrite the same.

Figure 10:
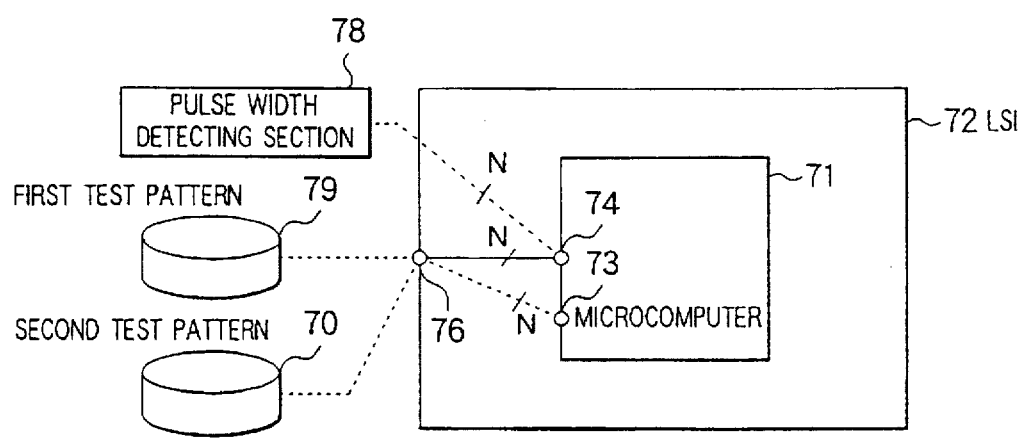
FIG. 10 is a block diagram illustrating a microcomputer block in an interconnection test according to a third embodiment of the present invention.

FIG. 10 is a block diagram, illustrating an LSI 72 including a microcomputer 71, for showing a method for testing interconnections for the microcomputer block according to a third embodiment of the present invention. The LSI of FIG. 10 corresponds to the LSI of FIG. 7, although the logic circuits shown in FIG. 7 are not depicted in FIG. 10. First inputs 73 of the microcomputer block 71 are connected to external input pins 76 through a logic circuit not shown in the drawing while second inputs 74 thereof are directly connected to the external input pins 76 in this design. The second inputs 74 of the microcomputer block 71 are monitorred by a pulse width detecting section 78 for detecting a pulse width of a low level pulse, while the external pins 76 of the LSI 72 are supplied with a first test signal pattern and a second signal pattern supplied from a first signal pattern generating section 79 and a second signal pattern generating section 70, respectively.

Figure 11:
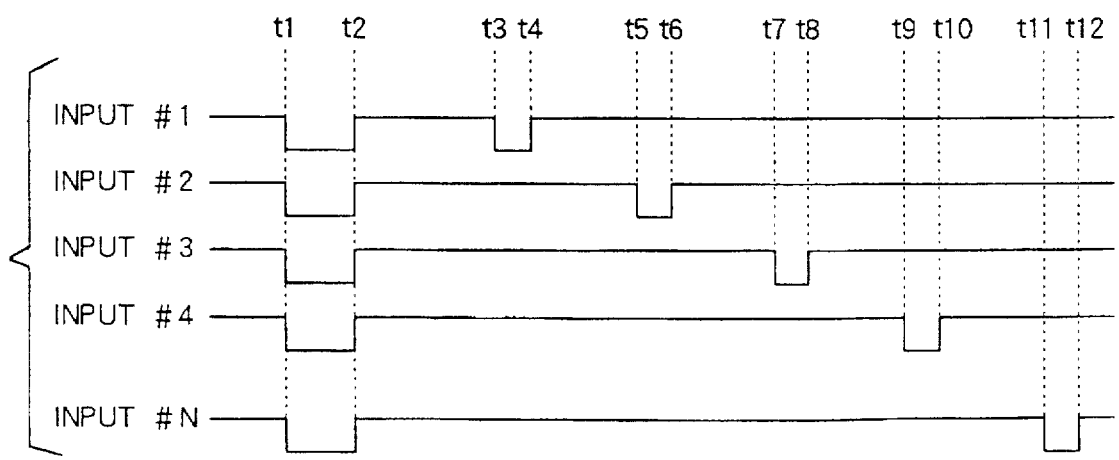
FIG. 11 is a timing chart illustrating another test signal pattern used in the method according to the third embodiment of the present invention.

FIG. 11 is a timing chart showing another test pattern for an interconnection test used for the LSI 72 including the microcomputer block shown 71 in FIG. 10.

The pulses shown in FIG. 11 are obtained by inverting the levels of the pulses shown in FIG. 5 from "1" to "0" and from "0" to "1".

During a period between t1 and t2 in a separate test mode for the microcomputer block 71, a second low level pulse having a pulse width greater than 10 ns is supplied to each of the external pins 76 so as to confirm that there is no differential circuit between the external pins and the inputs of the microcomputer block 71. If a differential circuit exists by an error, an alarm signal is generated at the time instant t2 from the pulse width detecting section 78 in response to a differentiated pulse.

During a period between t3 and t4, a first low level pulse having a pulse width less than 10 ns is supplied to the external pins 76. If the external pins 76 of the LSI 72 and the second inputs 74 of the microcomputer block 71 are connected in good order, an output signal for informing the correct interconnection is generated from the pulse width detecting section 78 at the time instant t4.

Similarly, during periods between t5 and t6, t7 and t8, t9 and t10, and t11 and t12, first low level pulses are successively input through external pins 76. If each of the interconnections is correct, an output signal is generated from the pulse width detecting section 78 at each of the time instants t4, t6, t8, t10 and t12, thereby informing the correct interconnections for the first through Nth inputs #1–#N. The first low level pulses are supplied through the external pins 76 in sequence so as to generate output signals in sequence and thereby detecting pins involving an interconnection error. Errors including an interconnection error are also detected wherein one of the external pins is not connected to any of the inputs of the microcomputer block, when no signal is generated from the pulse width detecting section.

In the above situation, if the external pins of the LSI and the inputs of the microcomputer block are connected in good order, an output signal is successively generated by the pulse width detecting section 78 for each of the inputs of the microcomputer block at each of the time instants t4, t6, t8, t10 and t12. The pulse width detecting section for a low level pulse 78 is provided for the inputs of the microcomputer block so as to detect a fault by not outputting an output signal, if the logical level is inverted between one of the external pins and corresponding one of the inputs of the microcomputer.

Although the present invention is described with reference to the preferred embodiments, the present invention is not limited to such embodiments and it will be obvious for those skilled in the art that various modifications or alterations can be easily made based on the above embodiments within the scope of the present invention.

What is claimed is:

1. A method for testing interconnections between external pins of an electric circuit and inputs of a circuit block disposed therein, said method including steps of:
    applying a first pulse to a first pin of the external pins, the first pulse having a first pulse width smaller than a minimum effective pulse width for the electric circuit;
    electrically monitoring the inputs during said applying step;
    determining whether a first input of said inputs comprises a pulse having a pulse width smaller than the minimum effective pulse; and
    determining whether said first input corresponds to said first pin.

2. A method for testing interconnections between external pins of an electric circuit and inputs of a circuit block disposed therein, said method including steps of:
    applying a first pulse to a first pin of the external pins, the first pulse having a first pulse width smaller than a minimum effective pulse width for the electric circuit;
    electrically monitoring the inputs during said applying step;
    generating an output signal when a pulse having a pulse width smaller than the minimum effective pulse width is detected on a first input of said inputs;
    applying a second pulse to said first pin, the second pulse having a second pulse width larger than the minimum effective pulse width: and
    electrically monitoring the inputs during said step of applying the second pulse.

3. A method for testing interconnections as defined in claim 2, wherein said step of applying the first pulse is consecutively executed upon a plurality of the external pins.

4. A method for testing interconnections as defined in claim 1, wherein the first pulse comprises a low level pulse.

5. A method for testing interconnections as defined in claim 1, wherein the electric circuit is for being implemented on a simulator.

6. A method for testing interconnections as defined in claim 5, wherein said method is applied to a design of a large scale integrated circuit ("LSI") that includes the electric circuit.

7. A method for testing interconnections as defined in claim 6, further including the step of selecting one of a plurality of operation modes for the circuit block, the operation modes including a normal operation mode and a test mode for the circuit block, wherein said second inputs are connected to a portion of the LSI other than said electric circuit during the normal operation mode.

8. A method for testing interconnections as defined in claim 7, further including the step of monitoring the second inputs to detect a signal pattern.

9. A method for testing interconnections as defined in claim 2, wherein said step of applying the first pulse is simultaneously executed upon said plurality of external pins.

10. A method for testing interconnections as defined in claim 1, wherein said step of determining whether said first input corresponds to said first pin includes a step of referring to a specification.

11. A method for testing interconnections as defined in claim 1, further comprising a step of applying a second pulse to said first pin, the second pulse having a second pulse width larger than the minimum effective pulse width.

12. A method for testing interconnections between external pins of a circuit and inputs of a circuit block, said circuit including said circuit block, said circuit having a minimum effective pulse width below which said circuit will not respond, said method comprising steps of:
    applying a first pulse to a first pin of said external pins, the first pulse having a first pulse width smaller than said minimum effective pulse width;
    generating an output signal when a pulse having a pulse width smaller than said minimum effective pulse width is detected on a first input of said inputs;
    applying a second pulse to said first pin, said second pulse having a second pulse width larger than said minimum effective pulse width.

* * * * *